United States Patent

[11] 3,604,960

[72] Inventor Erich Krestel
 Erlangen, Germany
[21] Appl. No. 5,817
[22] Filed Jan. 26, 1970
[45] Patented Sept. 14, 1971
[73] Assignee Siemens Aktiengesellschaft
 Erlangen, Germany
[32] Priority Feb. 5, 1969
[33] Germany
[31] P 19 05 624.7

[54] DENTAL DRILL HANDLE
 8 Claims, 5 Drawing Figs.
[52] U.S. Cl. .................................................. 310/50,
 310/58, 310/68 D, 318/254
[51] Int. Cl. ................................................. H02k 7/14
[50] Field of Search ........................................ 310/50, 47,
 52, 46, 66, 177, 68, 68.4, 58, 154, 40, 40 MM;
 318/138, 254; 32/26, 27

[56] References Cited
 UNITED STATES PATENTS
| 3,204,165 | 8/1965 | Kreutzer | 318/138 |
| 3,324,553 | 6/1967 | Borden | 32/27 |
| 3,427,720 | 2/1969 | Berman | 32/27 |
| 3,439,422 | 4/1969 | Doeden | 32/27 |
| 3,440,506 | 4/1969 | Krestel | 318/254 |
| 3,483,456 | 12/1969 | Brunner | 318/138 |
| 3,448,309 | 6/1969 | Epp | 310/50 UX |
| 3,509,629 | 5/1970 | Kidokoro | 32/27 |

Primary Examiner—D. X. Sliney
Assistant Examiner—R. Skudy
Attorney—Richards & Geier ABSTRACT: A dental drill handle has a small electric direct-current motor located in the handle and driven by an electronic commutator. The motor is cooled by compressed air. The structural part of the electronic commutator are all located within the handle in such manner that they are at least partly exposed to the flow of compressed air used for cooling the motor.

INVENTOR:
E. Krestel

BY Richards & Geier
ATTORNEYS

DENTAL DRILL HANDLE

This invention relates to a dental drill handle with a small electric motor built into the handle and preferably cooled by compressed air, the motor being driven by an electronic commutator.

Existing dental drill handles with a built-in small electric motor use direct current motors with a rotor provided with armature windings, a stator supplying a constant magnetic field and a mechanical commutator receiving current for the armature windings of the rotor through brushes or carbons. These motors have the drawback that they require continuous servicing since the brushes or carbons wear out and must be replaced after a certain time period. When carbon is used, continuous operation results in the dirtying of the bearings and thus in increased wear.

Furthermore, the mechanical commutator is subjected to a continuous rubbing off, caused by friction and spark formation, and when it is worn out it is necessary to repair the handle motor.

However, direct current motors are known which do not have these drawbacks. In these motors the rotor consists of a permanent magnet and the stator, in its simplest construction, has two armature windings shifted in relation to each other to the extent of 90°. The current is guided through the windings by a so-called electronic commutator consisting of electronic-switching means that are operated depending upon the rotation of the rotor. Preferably so-called hall generators are used to utilize the rotation of the rotor; they are located in the airgap between the rotor and the stator and are affected by the magnetic field of the rotor, so that voltages which are thus produced can serve as an operating signal for the electronic-switching means. The magnetic connection is provided by a package of sheet rings enclosing the windings. To provide the best possible switching small motors operating according to this principle have usually four armature windings in the stater and there are two generators shifted to the extent of 90° to regulate the armature current.

Rotors of this type are used for record players and sound recorders. The motor is then built into the casing by providing a cable extending from the motor to the operating electronic means, the means being provided with comparatively large cooling surfaces for the output transistors actuating the currents in the windings.

An object of the present invention is to apply the advantages of a motor with electronic commutators to comparatively small dental drill handles.

Other objects of the present invention will become apparent in the course of the following specification.

In the accomplishment of the objectives of the present invention it was found desirable to arrange the structural parts of the electronic commutator within the drill handle. This has the advantage that there are no additional electric conduits or cables which would make difficult or limit the use of the dental bore handle.

It is particularly advantageous to arrange the structural parts in such manner that they are at least partly exposed to the flow of compressed air used for cooling the motor. Due to this arrangement the electronic commutator can find space in the handle next to the electric motor without requiring a substantial increase in the size of the handle, since due to the cooling by compressed air the casing of the output transistors of the electronic commutator and their cooling surfaces can be made of small size.

It is advantageous to arrange the structural parts of the electronic commutator between the compressed air connection and the electric motor, so that they lie in the part of the cooling air current which has not reached the operationally warm electric motor.

Furthermore, it is advantageous to arrange the operating electrodes of the electronic commutator, preferably so-called hall generators, upon a front side of the motor and to connect them with catcher plates which engage the stray flow at the front side.

Due to this arrangement it is possible not to place the operating electrodes in the airgap between the stator and the rotor, as was customary heretofore, with the result that the diameter of the handle casing can be kept small. The use of the catcher plates receiving the stray field results in that the effect of the magnetic field of the rotor upon the generators is sufficiently great, so that the generator voltages can be used for operating the current in the windings.

The invention will appear more clearly from the following detailed description when taken in connection with the accompanying drawings showing by way of example only, preferred embodiments of the inventive idea.

Figure 1:
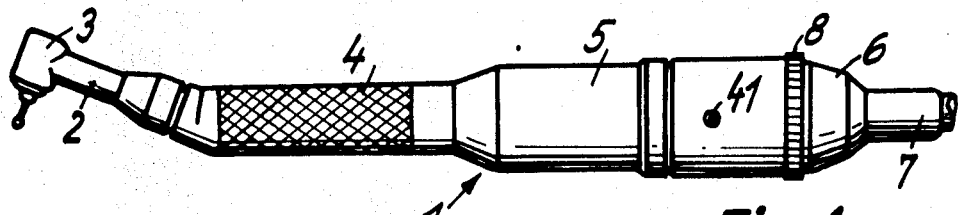
FIG. 1 is a side view of the dental drill handle containing a small electric motor.

The dental drill handle 1 shown in FIG. 1 includes an angularly extending front portion 2 with the drill head 3, a narrow gripping portion 4, a widened cylindrical casing portion 5 containing the electric motor and an end piece 6 receiving the ends of conduits for the electrical current and compressed air enclosed in a supply hose 7. The end piece 6 is connected with the casing 5 by a capscrew 8.

Figure 2:
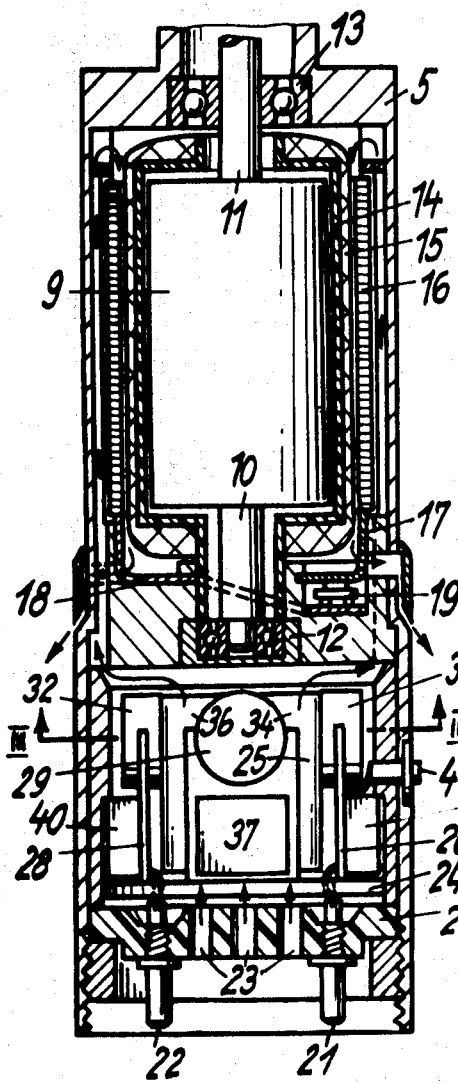
FIG. 2 is an enlarged longitudinal section through a part of the handle containing the electric motor with the electronic commutator arranged in accordance with the principles of the present invention.

FIG. 2 shows the arrangement of the small electric motor with the electronic commutator within the casing 5. The motor consists of cylindrical rotor 9 which is a permanent magnet and has shaft ends 10 and 11 carried in ball bearings 12 and 13. The driving shaft for the drill head which extends through the gripping portion 4 (FIG. 1) is connected by a suitable coupling (not shown) with the shaft end 11. The stator of the electric motor consists of a casing 14 made of plastic material and carrying four windings 15. The motor is also enclosed by a sheet metal package 16 consisting of sheet metal rings and constituting the magnetic return. Catcher plates 17 and 18 are connected with the sheet metal package 16. The so-called hall generator 19 which is the steering electrode, is located between the plates 17 and 18.

FIG. 2 shows only one generator 19. However, since the illustrated embodiment pertains to a motor with two steered pairs of armature windings, the casing 5 contains a second generator which is placed at an angle of 90° relatively to the generator 19 and which is not illustrated in FIG. 2 so as not to confuse the drawing.

Obviously the number of generators can be still further increased when windings having a greater number of poles are used.

A disc 20 consisting of an insulating material separates the casing 5 from the connecting piece 6 and carries pins 21 and 22 which are connected with corresponding sleeves of the connecting piece 6 and are used to provide the motor with electrical current. Furthermore, the disc 20 has openings 23 for the passage of compressed air. The flow of the cooling air is indicated by arrows in FIG. 2.

A ring 24 is used for holding the separate parts of the electronic commutator. The ring 24 is located between the electric motor and the disc 20 and extends parallel to the disc 20; it is connected with the casing 5 and carries close to its inner edge four rectangular conducting plates 25 to 28 which are mounted perpendicularly to the ring (see also FIG. 3). The upper edges of the plates 25 and 28 are provided with semicircular openings and a separate output transistor is fixed in each of these openings. These transistors are indicated by numerals 29 to 32 in the drawings. Cooling surfaces 33 to 36 are connected with the transistors and are directed toward the interior of the casing. Thus these surfaces are located within the space through which cooling air for the electric motor is guided. The conducting plates 25 to 28 also carry amplifiers 37 to 40 cast of plastic material any used to amplify the generator voltages. A switch 41 fixed to the casing 5 can be used to reverse the direction of rotation of the motor. The operation of the motor will be described in greater detail hereinafter in conjunction with the description of the diagram of FIG. 5.

Figure 3:
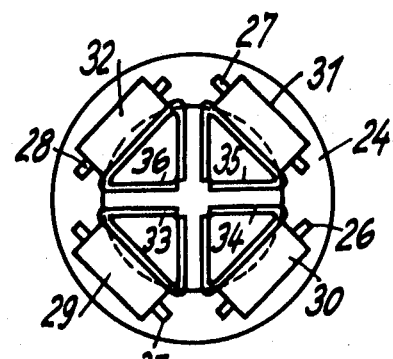
FIG. 3 is a transverse section along the line III—III of FIG. 2 and shows four transistors built into the handle.

FIG. 3 illustrates an advantageous arrangement of the cooling surfaces 33 to 36. The cross sections have the shape of isosceles triangles one side of which is connected with the transistors.

Figure 4:
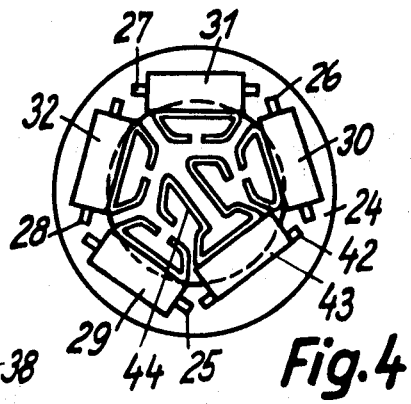
FIG. 4 is similar to FIG. 3 but shows a construction wherein five transistors are built into the handle.

The embodiment of FIG. 4 shows a further conducting plate 42 with a transistor 43 and a comparatively large cooling surface 44.

Figure 5:
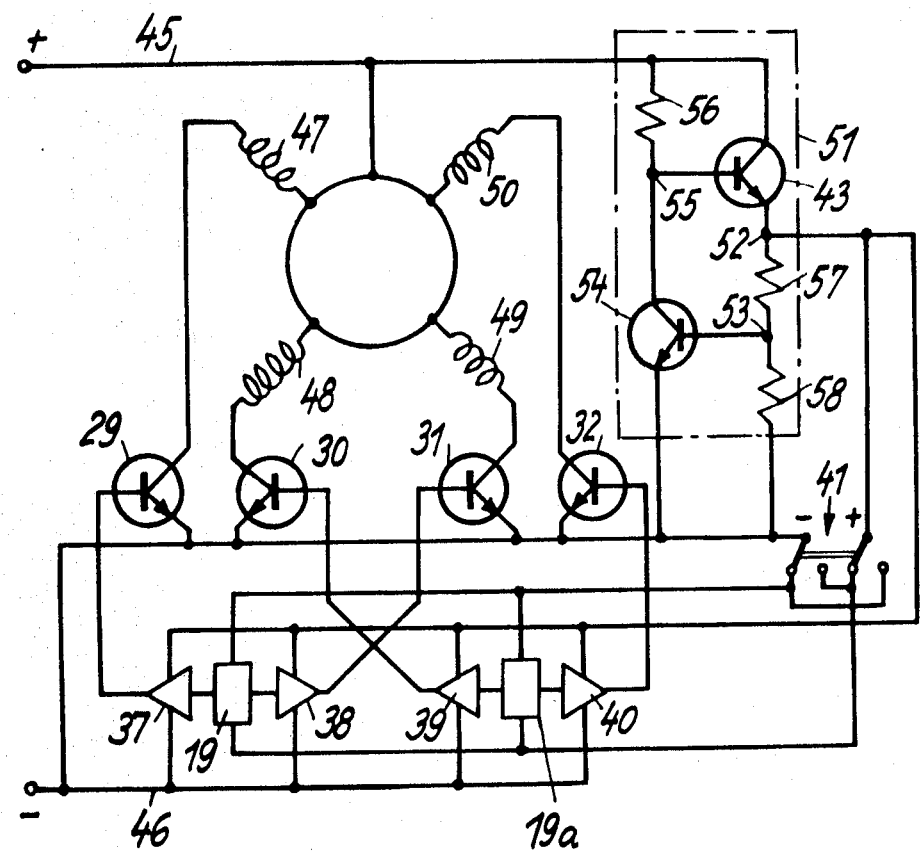
FIG. 5 is a switch diagram.

FIG. 5 shows a switch diagram for all electrical devices located within the handle 1. The two supplying conduits 45 and 46 end at the pins 21 and 22 which are connected with electrical conduits located in the supply hose 7. The four armature windings of the electrical motor are indicated by numerals 47 to 50 in FIG. 5. One end of the windings is connected with the plus pole 45, which their other ends are connected with the collectors of the four output transistors 29 to 32, the emitters of which are connected to the minus pole 46. So-called hall generators 19 and 19a are used to direct the current in the transistors 29 to 32 and consequently, in the windings 47 to 50. The generator voltages which are thus produced extend over amplifiers 37 to 40 to the base of the transistors 29 to 32, which then provide the windings 47 to 50 with current depending upon the position of the rotor.

In accordance with the illustrated embodiment the speed of rotation of the motor is regulated by an electronic regulating device (not shown) provided in the dental unit, in that the r.p.m. are changed by changing the voltage supplied to the pins 21 and 22 through the hose 7. Since a constant supply voltage is necessary for the amplifiers 37 to 40 and for the generators 19 and 19a, the handle is additionally provided with a simple switching device to hold voltage constant for the specific parts. Parts constituting this switching device are shown in FIG. 5 as being enclosed by the broken line 51. The main parts for this switching device are located upon the fifth conducting plate indicated by the numeral 42 in FIG. 4. Since the transistor 43 is subjected to a greater load than the other transistors 29 to 32, it is provided with a correspondingly larger cooling surface 44.

An increase in the supply voltage will also provide a voltage increase at the points 52 and 53. An increase in voltage at the point 53 and thus at the base of the transistor 54 will cause the transistor 54 to allow a greater passage of current, so that the voltage drop at the transistor 54 will be smaller. Then the voltage at the point 55 and also at the base of the transistor 43 will be lower, so that this transistor will pass through less currents. This will increase the drop in voltage through the transistor 43. An increase in voltage in the supply conduits 45 and 46 will thus increase the drop in voltage through the transistor 43. Similarly a voltage drop in the conduits 45 and 46 will reduce the voltage drop through the transistor 43. The resistances 56 to 58 of the switching device are of such size that the voltage at the point 52 remains constant. The amplifiers 37 to 40 and the generators 19 and 19a are located between the point 52 with constant voltage and the minus pole.

Finally, a two-pole switch 41 is provided with which the polarity of the supply voltage located at the generators can be reversed. Then reverse generator voltages are supplied which reverse the direction of rotation of the motor.

What is claimed is:

1. In a dental drill, a handle, a small electric direct-current motor located within said handle, an electronic commutator located within said handle, switch means located within said handle and operatively connecting said electric motor with said electronic commutator, and means connected with one end of said handle and supplying cooling compressed air to said electric motor and said electronic commutator, said compressed air flowing at least partly around portions of said electronic commutator.

2. A device in accordance with claim 1, wherein said switch means are so located within the handle that they are exposed to at least a part of the compressed air flowing to cool said motor.

3. A device in accordance with claim 2, wherein said switch means are located between said electric motor and said compressed-air supplying means.

4. A device in accordance with claim 3, wherein said handle has a central passage for the flow of compressed air and wherein said switch means comprise transistors located circularly around said passage and having cooling surfaces exposed to the flow of compressed air.

5. A device in accordance with claim 4, wherein said cooling surfaces extend inwardly.

6. A device in accordance with claim 5, wherein said electric motor comprises a stator and a rotor and wherein said electric commutator comprises steering electrodes mounted upon the front side of said motor and catcher plates connected with said steering electrodes, said catcher plates receiving the stray flow at the front side of the rotor.

7. A device in accordance with claim 6, wherein said switch means further comprise means producing a constant voltage for said steering electrodes and amplifiers connected with the last-mentioned means.

8. A device in accordance with claim 7, further comprising a switch carried by said handle and means connecting said switch with said steering electrodes for reversing the direction of current flow in said steering electrodes.